Figure 1:
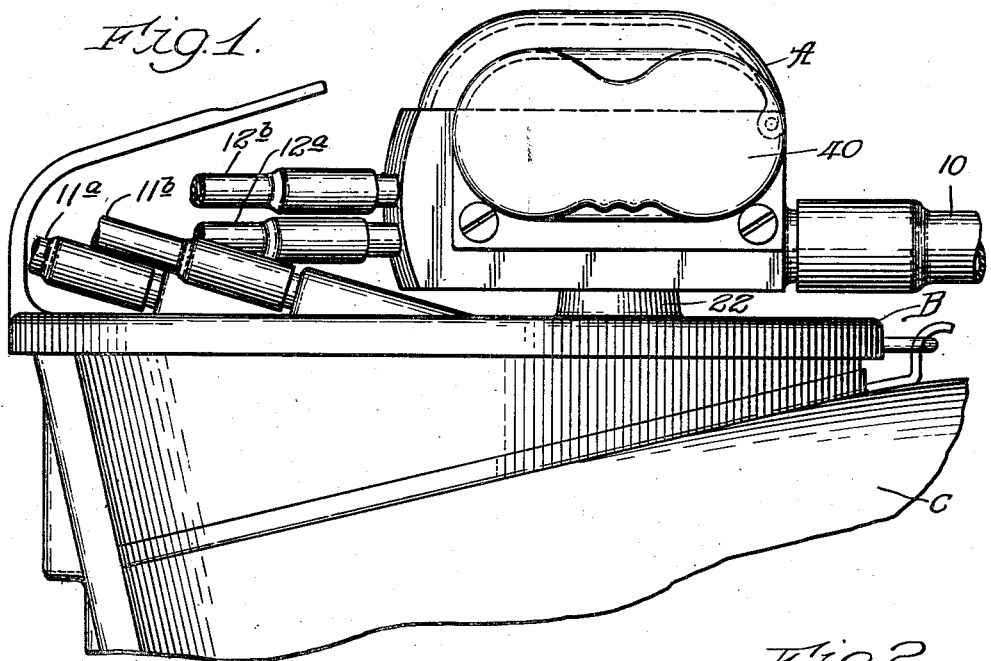

July 21, 1953  C. A. THOMAS  2,646,058
MILKING MACHINE PULSATOR
Filed Dec. 3, 1949  3 Sheets-Sheet 1

Inventor:
Chester A. Thomas,
By Schroeder, Merriam,
Hofgren & Brady, Attys.

July 21, 1953   C. A. THOMAS   2,646,058
MILKING MACHINE PULSATOR
Filed Dec. 3, 1949   3 Sheets-Sheet 2

Inventor:
Chester A. Thomas,
By Schroeder, Merriam,
Hofgren & Brady, Attys.

July 21, 1953 C. A. THOMAS 2,646,058
MILKING MACHINE PULSATOR
Filed Dec. 3, 1949 3 Sheets-Sheet 3
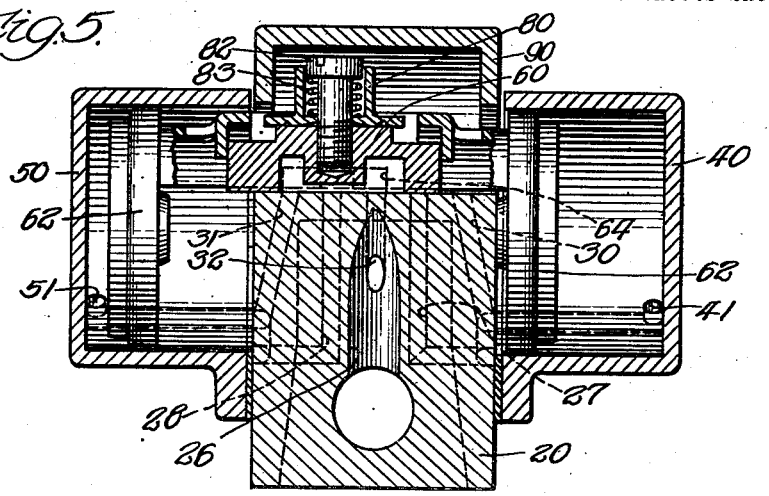
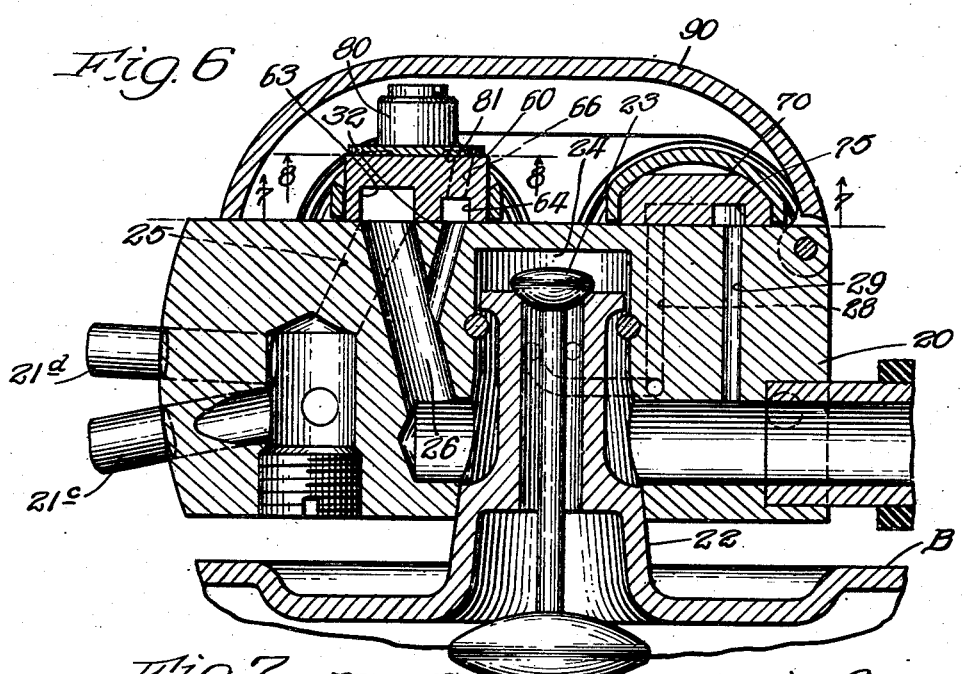
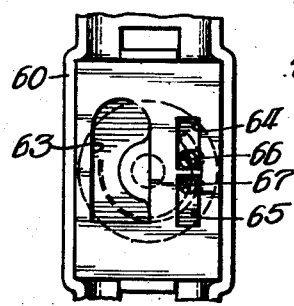
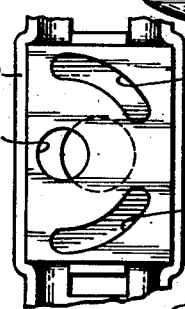
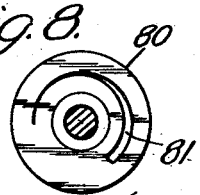
Inventor:
Chester A. Thomas,
By Schroeder, Merriam,
Hofgren & Brady, Attys.

Patented July 21, 1953

2,646,058

UNITED STATES PATENT OFFICE 2,646,058

MILKING MACHINE PULSATOR

Chester A. Thomas, Lake Forest, Ill., assignor to
Babson Bros. Co., a corporation of Illinois Application December 3, 1949, Serial No. 130,877

11 Claims. (Cl. 137—103)

This invention relates to a milking machine pulsator and more particularly to control apparatus for regulating the speed of operation of such a device.

A pneumatically operated device which uses a very small volume of air in effecting its operating movements, as a milking machine pulsator, is frequently subject to clogging difficulties where the atmosphere in which it is used contains any suspended foreign particles. In effecting operation of the conventional milking machine pulsator at a normal rate, for example, sufficient air is provided by a restricted opening which may be of the order of only 15/1000 to 25/1000 of an inch in diameter. Since this device is generally used in a barn where the air contains a substantial amount of foreign material in suspension, such as dust, lint, tiny bits of straw, and the like, clogging of the very restricted control portion of the air flow passageway in the pulsator can be, and frequently is, a serious problem. A pulsator may have its regulating knob adjusted to provide an orifice sufficient to effect some desired rate of pulsator operation, as 50 cycles per minute, and clogging by fine bits of suspended matter will gradually decrease this until frequently the rate of operation will be well below a desired minimum before milking has been underway very long. This has required frequent readjustments of pulsator operation during milking, particularly where the herd is of any substantial size, readjustments which would otherwise be unnecessary, except for perhaps one or two exceptional cows, if this clogging could be overcome.

One feature of the invention here being disclosed and claimed is that it provides a new and improved control arrangement, for a pneumatically operated device where the operating flow of air is small, which overcomes difficulties with clogging accumulation of foreign matter; another feature of this invention is that foreign matter which might otherwise remain at the restricted portion is almost immediately, generally within one or two cycles of pulsator operation, carried away from the restricted point of control; and another feature of this invention is that clogging difficulties heretofore encountered at a small control orifice are overcome without in any way detracting from the convenience and ease of adjustment of control speed heretofore provided by other types of control arrangements on the market.

Figure 2:
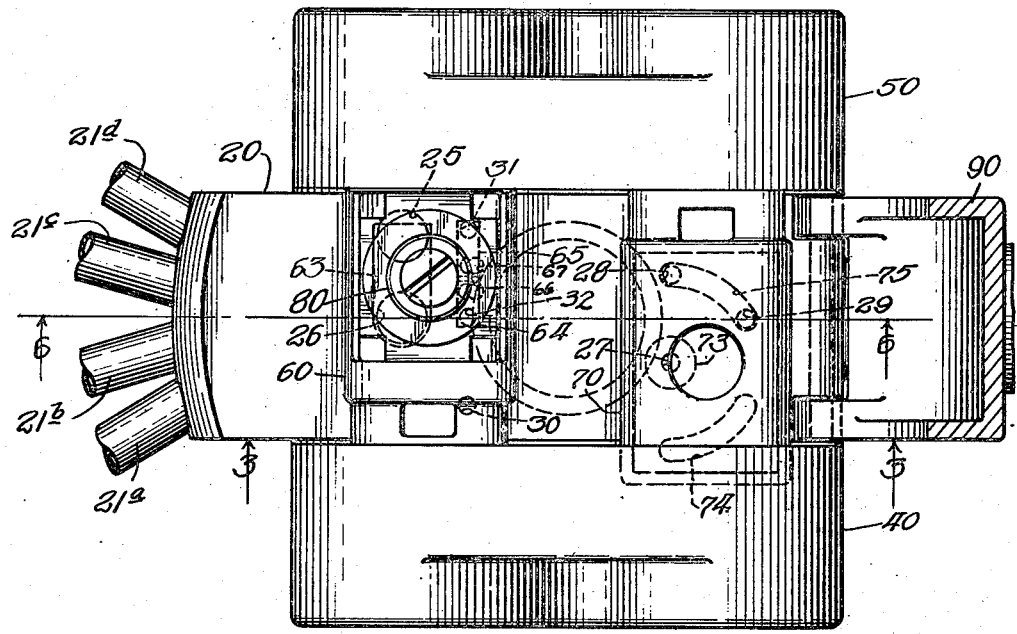
Figure 3:
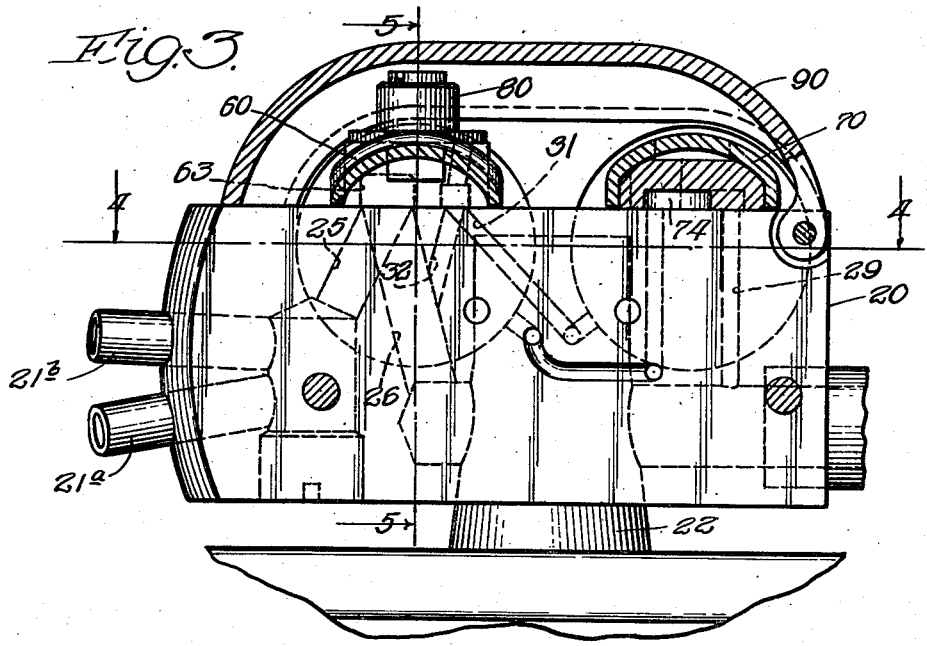
Figure 4:
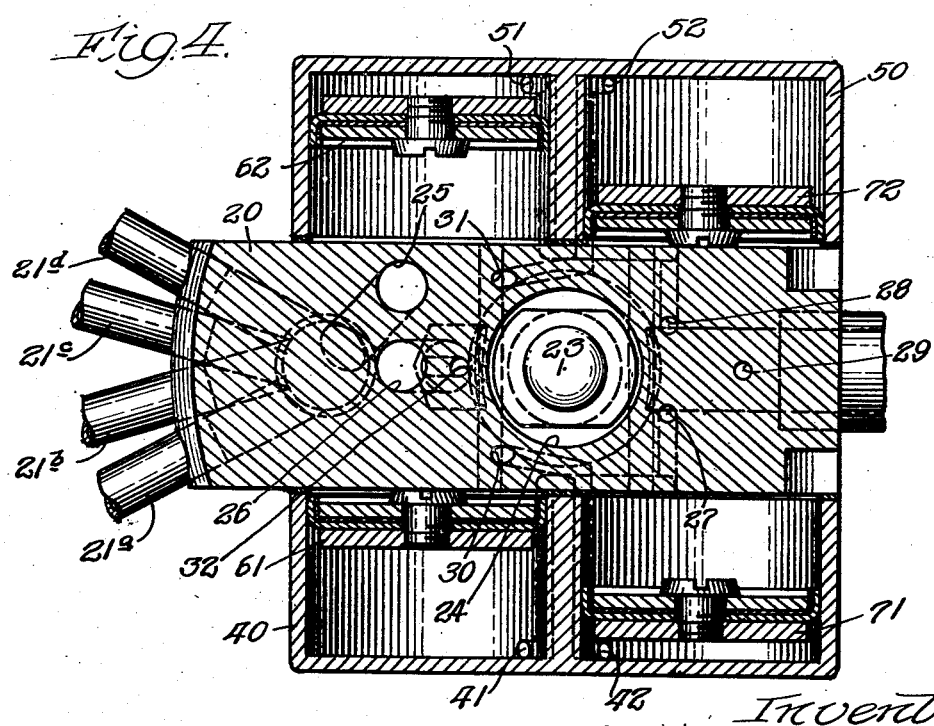

Other features and advantages of this invention will be apparent from the following specification and the drawings in which:

Figure 1 is a fragmentary side elevational view of a pulsator embodying my invention and of a part of the milking machine with which it may be associated; Figure 2 is an enlarged plan view of the pulsator with the cover removed; Figure 3 is a vertical sectional view along the line 3—3 of Figure 2, the section line being taken at the junction between the body block and one cylinder assembly; Figure 4 is a horizontal sectional view along the line 4—4 of Figure 3; Figure 5 is a transverse vertical sectional view along the line 5—5 of Figure 3; Figure 6 is a vertical sectional view along the line 6—6 of Figure 2; Figure 7 is a detail view of the bottom of the slide valve members to better show the openings therein, along the line 7—7 of Figure 6; and Figure 8 is a bottom view of the regulator member showing the tapering restricted slot therein, along the line 8—8 of Figure 6.

Figure 9 is a detailed view of the timer valve slide and connecting slots.

The particular pulsator illustrated herewith, and which will hereafter be described as an illustrative embodiment of my invention, comprises a pulsator which corresponds to one which has been on the commercial market except for the changes in the control arrangement to provide the improvements to which this application is directed. The present improvement comprises not only a re-location and change in character of the actual regulating member itself but also some change in the control porting to provide the completely new mode of operation which characterizes this control arrangement.

I have found that I can minimize clogging troubles, and variations in rate of pulsator operation resulting therefrom, to a point of practically complete elimination of this difficulty. The new mode of operation which is the principal factor in this improved result arises from so constructing and arranging the control apparatus that the direction of air flow through the variable restricting portion of small size alternates during each cycle of pulsator operation. That is, as will become more fully apparent hereafter, air flow through the control orifice or restricting portion is in one direction during one portion of the cycle of pulsator operation, and in the other direction during the other portion of the cycle. I accomplish this by associating the section of passageway having the regulating restriction of variable effective cross-sectional area therein with an automatically operating reversing valve which periodically automatically reverses the connection of this section of the passageway with the remainder of the system through which the air flows.

In regulating arrangements heretofore used in pulsators, air has entered a pulsator cylinder from the atmosphere with some dust or other foreign matter therein. In the next portion of the cycle of pulsator operation, the air in that cylinder has been drawn out of it through a passageway having the restricting or control orifice in one portion, and eventually communicating with the vacuum hose providing a source of constant vacuum. While the pulsator valve arrangement caused alternate evacuation of different cylinders in the pulsator, the movement of air through the restricting portion to the passageway under constant vacuum always flowed in one direction only, and necessarily so with all previous arrangements known to me. Any dust or other bits of foreign matter in the air which were of a size such that they would not readily and immediately pass through the regulating restricting portion thus piled up on what may be termed the "inlet" side. The first such bit of matter was generally followed by others and the resulting further restriction of the effective flow passageway caused an undesired continuing reduction in rate of pulsator operation until sometimes the pulsator stopped entirely.

In the arrangement here being disclosed, I have changed the location of the regulating member and variable restricting orifice from the body of the pulsator to a position on one of the slide members, so that the section of the passageway in the slide member and having the restricting portion therein is relatively short and is moved with respect to the ports in the pulsator body upon each movement of the slide member. I have so arranged the communicating ports in the underside of this section of the slide member, and in the section of the body member with which they cooperate, that the direction of air flow through that section of the passageway which is in and carried by the slide member reverses upon each movement of the slide member between the limits of its positions incident to the operation of the main pulsator valve; such flow reversal takes place only in this relatively small passageway section.

By this arrangement any dust, lint, or other foreign matter getting into a cylinder, and moving from there through the passageways in the cylinder section and body member of the pulsator, reaches the section of the passageway in the slide member, and if it is large enough to cause clogging, stops at the restricting portion without passing through it. This may slow down the completion of movement in that portion of the particular cycle of pulsator operation in which this happened, but as soon as the valve slide reverses its position the passageway section has its connections reversed and air flow now takes place through it in the opposite direction. Accordingly, the bit of foreign matter which was previously stuck on what was then the "inlet" side of the restricting or control orifice, then effectively has become on the "outlet" side of that orifice so that air flow through this section of the passageway carries this bit of matter out and into the other and larger passageways in the body of the pulsator communicating with the vacuum hose. This takes place because the section of the passageway having the restricting portion therein and having the flow therethrough reversed is short enough that bits of matter lodged on one side of the restricting portion are, upon reversal of connections, carried out of this small section of the passageway and gotten rid of before reversal action takes place, at least in most cases. Even if such disposition of the bits of foreign matter does not take place on reversing, I find that it practically always takes place on a few such reversals so that the extremely small control orifice is self-cleaning.

In order to clearly bring out the way in which this improved control arrangement operates, I will first briefly describe the pulsator in its entirety. Since pulsators similar in all respects to that shown here, except for the control arrangement, have been on the market and are the subject of issued patents, as for example Fosler Patent 1,376,804, I will not go into the passageway arrangement and general construction in too great detail, as reference may be made to such patent to supplement the present general description, if desired.

In the particular embodiment of the invention illustrated herewith, a pulsator identified in general as A is shown mounted on the cover B of the pail C of a milking machine of the suspended type. A more complete description of such a milking machine and its operation may be had, if desired, by reference to already issued patents, as for example McCornack Patent 1,859,213.

For the purposes of this description, it is believed sufficient to state that the vacuum hose 10 provides a steady source of vacuum, usually having its other end connected through a stall cock to a pipe line in turn communicating with a vacuum pump and vacuum accumulator tank. The vacuum hose and line provide a source of pressure differential which effects not only the pulsator operation, but also the vacuum operations incident to the actual milking. Commercial milkers for several decades have been of the double acting type, involving maintenance of a steady vacuum in the pail and use of such a vacuum through the milk tubes on the ends of the teats to open the teat canals and effect a discharge of milk into the pail. In order to provide periodic relief for the teats, vacuum and atmospheric pressure are also alternately applied to the teat cup assemblies between the rigid outer shell and the flexible inner lining or inflation, this alternate operation being effected by the pulsator. The pulsator comprises a pneumatically actuated valve arrangement which is operated by the pressure differential between vacuum and atmosphere to actuate an operation controlling valve here termed the main valve, at a rate determined by a timing arrangement in turn controlled by the regulating member. In the arrangement illustrated in Figure 1, the tubes identified as 11a and 11b comprise the milk tubes or inflation stems connected to nipples on the milker lid; and the tubes identified as 12a and 12b are tubes leading from the shells of the teat cup assemblies and connected to nipples on the pulsator body which communicate with the main vacuum supply, or with atmosphere, in accordance with the position of the main valve member in the pulsator.

When the pulsator is spoken of as being operated by "pressure" it will be understood that this term is being used generically to indicate any kind of a relative pressure difference capable of effecting air flow through a pneumatically operated device. In the sense in which it is used in this application, the "source of operating pressure" is actually a source of vacuum; that is, a source of negative pressure in relation to the atmosphere.

Referring now more particularly to Figures 2 to 6, it will be seen that the pulsator comprises as its principal parts a central block or body member 20, a pair of side portions or cylinder sections 40 and 50, main and timing valve slide members 60 and 70, a regulating member 80, and a pivotally mounted cover 90. As may be best seen in Figure 4, the side portions 40 and 50 provide two pairs of opposed cylinders having movably mounted therein two pistons 61 and 62 connected to opposite ends of the slide member 60 in one case and the pistons 71 and 72 connected to opposite ends of the slide member 70 in the other case, the pistons being movable together and with the slide member in each case. The slide member to the left, as viewed in the drawings, is being here termed the main valve member, this slide having openings communicating with ports as will be hereinafter more fully described to alternately connect the nipples 21a–d to atmosphere and to vacuum, these nipples being the ones which received the tubes 12. This same slide member and the associated regulated member and ports also provide the control arrangement which is the subject of this application, a control arrangement which controls the rate of movement of the right-hand slide member or timing valve 70, since it is this valve which controls the rate of operation or times the movement of the main valve and thus the rate of pulsator operation. The operation of the main valve 60 and its associated pistons is intermittent but relatively rapid when it takes place and that of the timing valve 70 and its associated pistons is relatively continuous but at a relatively slow rate determined by the regulation effected manually.

As may be best seen in Figure 6, the pulsator is removably mounted on an upstanding portion or stud 22 on the lid B, this portion having a central opening therethrough controlled by a check valve 23 and, when open, providing communication between the interior of the bucket and the central chamber 24 in the pulsator body. Since the chamber 24 is at all times in open communication with the vacuum hose 10, the interior of the bucket is maintained at a vacuum slightly lower (in an amount determined by the weight of the check valve) than that existing in the hose 10, the source of supply of negative pressure relative to the atmosphere.

When the slide member 60 is in the position shown in the drawings, as may be best seen in Figures 2 and 6, the pulsator nipples 21 communicate through a passageway 25 with a slot 63 in the main valve 60. This slot or groove in the underside of this main valve in this position provides communication with the passageway 26 communicating with the chamber 24 and thus constantly open to the vacuum which comprises the operating pressure. When the main valve is in the other or opposite position at the opposite limit of its range of movement (down as the parts are viewed in Figure 2), the passageway 25 is uncovered by the end of the slide valve and in open communication with atmosphere, thus effecting a collapse of the inflations in the teat cup assemblies to provide the desired intermittent rest periods for the teats.

The outermost ends of the cylinders receiving the pistons 61 and 62 to effect a movement of the main valve slide have opening thereinto passageways 41 and 51. These communicate through suitable intermediate passageways in the body member or central block 20 with ports 27 and 28, respectively, immediately under the face of the timing valve slide 70. The timing slide 70 is provided with a central opening 73 providing communication between atmosphere and the cylinder containing the piston 61 when the parts are in the positions illustrated, as may be best seen in Figures 2 and 4, and with a pair of closed slots or grooves 74 and 75 in the underside thereof. In the position illustrated in Figure 2, this provides communication between the port 28 leading to the cylinder having the piston 62 therein and a port 29 communicating directly with the vacuum hose, as may be best seen in Figure 6. It is the presence of this vacuum beyond the outer end of piston 62 with the other piston 61 of this pair being open to atmosphere which has just resulted in movement of the main valve to the position shown in the drawings.

However, movement of the main valve to this position provides control arrangement connections effecting operation of the timing valve in such manner that piston 72 starts to move upwardly (as viewed in Figure 4) at a rate determined by the rate of flow permitted by the particular manual adjustment of the regulating member 80 at that time. It will be understood that the cover 90 is swung up at any time that it is desired to effect manual rotation of this regulating member, which is then readily accessible. After the timing valve has reached the other limit of its movement, the port 28 (see Figure 2) is open to atmosphere and the port 27 connected to the vacuum port 29 by the slot 74. Since there are no restrictions in the passageway thus provided between vacuum and the opening 41 in the outer end of the cylinder having the piston 61 therein, the main valve member then "snaps over" or moves relatively rapidly to its alternate position opening the pulsator connector nipples 21 to atmosphere.

In order to provide the desired alternating but regulated air flow effecting operation of the timing valves, passageways between the ports 42 and 52 at the outer ends of the timing piston cylinders (see Figure 4) are provided leading to and communicating with the ports 30 and 31 in the surface of the pulsator body member 20 under another and different portion of the slide member 60. This slide member is provided with a pair of pockets 64 and 65 in the under surface thereof which, in the position illustrated in the drawings, provides communication between the port 31 and a port 32 constantly open to vacuum by being in communication with the passageway 26 as may be best seen in Figures 5 and 6. At this same time, the other port 30 communicating with the port 42 is open to atmosphere being uncovered by the end of the slide block as may be best seen in Figure 5.

Communication between the pockets 64 and 65 (and thus between vacuum and one of the ports 30 and 31) is completed only through the passageway section which includes the restricted variable orifice portion, and which comprises a short flow passageway section having the regulating arrangement.

Referring now more particularly to Figures 5, 6 and 7, it will be seen that the pocket 64 has a short drilled passageway 66 leading up therefrom to the upper surface of the slide block, wherein the port in the upper surface of the slide block provided by this drilled opening is in communication with a portion of the tapered slot 81 (see Figure 8) in the underface of the regulating member 80. This regulating member is rotatably mounted on the top of the slide block 60 by a stud 82, and is held in tight but movable engagement with the upper surface of the slide block by a spring 83. The pocket 65 communicates through a similar drilled opening 67 with another port also registered with the elongated slot 81 so that communication between the pockets 64 and 65 is completed through the openings 66 and 67 and through a portion of the tapering slot 81. This tapering slot is quite long relatively to the diameter of the pair of similar ports with which it cooperates, and has at least the smallest portion very much narrower than the diameter of such port openings.

By this arrangement the passageway section comprising the parts 64, 66, 81, 67 and 65, is alternately connected by movement of the slide member 60 to the vacuum passageway 32 and to one of the timing piston operating ports 30 or 31. It will be noted that when the parts are in the position illustrated in the drawings, air enters through the pocket 65 and leaves through the pocket 64, thus passing through the section of the tapering slot 81 providing the restricting orifice in one direction; whereas when the parts are in the opposite position air enters through the pocket 64 and leaves through the pocket 65 providing a reverse direction of flow through this short section of passageway provided in the slide member and regulating member.

It is this automatic and periodic reversal of the direction of flow through this control section of passageway which provides the desired avoidance of clogging difficulties heretofore described. Moreover, by using a tapering slot of the character illustrated, rather than a needle valve, the effective control opening, whether large or small, is always concentrated in a single area rather than being distributed in a relatively narrow annulus around a needle valve. If the regulating member is so adjusted that the smallest portion communicating with one of the cooperating ports provides an effective opening in the neighborhood of $20/1000$ of an inch, for example, particles of smaller size than this will pass through and cause no difficulty. On the other hand, particles of foreign matter large enough to stick and stop, on whatever happens to be the inlet side at the time they reach the restricting portion, will normally be swept away and carried on through the passageway 32 upon the next reversal of flow connections, providing the self-cleaning arrangement which has proved so advantageous.

While I have shown and described certain embodiments of my invention, it is to be understood that it is capable of many modifications. Changes, therefore in the construction and arrangement may be made without departing from the spirit and scope of the invention as disclosed in the appended claims.

I claim:

1. In a milking machine pulsator of the pneumatically operated type, control apparatus including: flow control means comprising a regulating member for varying the effective cross-sectional area of a restricting portion of a passageway through which operating air flows; a source of operating pressure; and an automatically movable reversing valve member connecting opposite ends of said passageway alternately to said source of operating pressure for periodically reversing the air flow through said restricting portion to minimize clogging accumulations.

2. In a milking machine pulsator of the pneumatically operated type, control apparatus including: flow control means comprising a manually adjustable regulating member for varying the effective cross-sectional area of a restricting portion of a passageway through which operating air flows; a source of operating pressure; and a reversing valve member operatively associated with said pulsator and automatically moved by and in accordance with the cycle of pulsator operation and connecting opposite ends of said passageway alternately to said source of operating pressure for periodically reversing the air flow through said restricting portion to minimize clogging accumulations.

3. In a milking machine pulsator of the type having a pneumatically operated main valve, control apparatus including: flow control means comprising a manually adjustable regulating member for varying the effective cross-sectional area of a restricting portion of a passageway through which operating air flows; a source of operating pressure; and a reversing valve member automatically moved by and in accordance with movement of the main valve and connecting opposite ends of said passageway alternately to said source of operating pressure for periodically reversing the air flow through said restricting portion to minimize clogging accumulations.

4. Apparatus of the character claimed in claim 3, wherein said main valve and said reversing valve member comprise portions of a single slide member.

5. In a milking machine pulsator of the type having pneumatically operated main and timing valves, control apparatus including: flow control means comprising a manually adjustable regulating member for varying the effective cross-sectional area of a restricting portion of a passageway through which operating air flows; a source of operating pressure; and a reversing valve member automatically moved by and in accordance with movement of the main valve and connecting opposite ends of said passageway alternately to said source of operating pressure and to said timing valve operating means for periodically reversing the air flow through said restricting portion to minimize clogging accumulations.

6. In a milking machine pulsator of the type having vacuum operated main and timing valves, control apparatus including: flow control means comprising a manually adjustable regulating member for varying the effective cross-sectional area of a restricting portion of a passageway through which operating air flows; a source of vacuum; and a reversing valve member automatically moved by and in accordance with the cycle of valve operation and connecting opposite ends of said passageway alternately to a port communicating with said source of vacuum and to another port communicating with said timing valve operating means for periodically reversing the air flow through said restricting portion to minimize clogging accumulations.

7. Apparatus of the character claimed in claim 6, wherein said reversing valve and one of said first mentioned valves comprise portions of a single slide member.

8. Apparatus of the character claimed in claim 2, wherein said regulating member is rotatably mounted on a port member and has a tapering slot therein at least partly in communication with ports in said port member.

9. Apparatus of the character claimed in claim 6, wherein said main valve and said reversing valve member comprise portions of a single slide member and said regulating member is rotatably mounted on said slide member and has a tapering slot therein at least partly in communication with ports in said slide member to provide the restricting portion of said passageway, said slot being longer and having at least a portion narrower than a port opening with which it communicates.

10. In a pneumatically operated device, control apparatus including: flow control means comprising a regulating member for varying the effective cross-sectional area of a restricting portion of a passageway through which operating air flows; a source of operating pressure; and an automatically movable reversing valve member connecting opposite ends of said passageway alternately to said source of operating pressure for periodically reversing the air flow through said restricting portion to minimize clogging accumulations.

11. In a pneumatically operated device, control apparatus including: flow control means comprising a member rotatable about an axis, said member having a passageway of diminishing cross sectional area arcuately spaced with respect to said axis; a source of operating pressure; and an automatically movable reversing valve member connecting opposite ends of said passageway alternately to said source of operating pressure for periodically reversing the air flow through said restricting portion to minimize clogging accumulations.

CHESTER A. THOMAS.

References Cited in the file of this patent

UNITED STATES PATENTS

| Number | Name | Date |
|--------|------|------|
| 935,521 | Kilborn | Sept. 28, 1909 |
| 1,392,346 | McCornack | Oct. 4, 1921 |
| 2,012,258 | Christensen | Aug. 27, 1935 |
| 2,017,807 | Schmitt | Oct. 15, 1935 |
| 2,333,019 | Lemm | Oct. 26, 1943 |
| 2,419,844 | McArthur et al. | Apr. 29, 1947 |